United States Patent Office 3,574,766
Patented Apr. 13, 1971

3,574,766
PROCESS FOR THE PRODUCTION OF β-METHYL-MERCAPTOPROPIONALDEHYDE
Gerhard Meyer, Obernburg (Main), and Helmut Magerlein and Hans-Dieter Rupp, Erlenbach, Germany, assignors to Glanzstoff AG, Wuppertal, Germany
No Drawing. Filed Oct. 3, 1968, Ser. No. 764,946
Claims priority, application Germany, Oct. 13, 1967, P 16 68 139.3
Int. Cl. C07c 45/00
U.S. Cl. 260—601          7 Claims

ABSTRACT OF THE DISCLOSURE

Process for producing β-methylmercaptopropionaldehyde in high yields by reacting acrolein with methylmercaptan in the presence of the catalyst $$R_3XY$$

where each R is a monovalent organic radical, X is phosphorous, arsenic or antimony and Y is oxygen or sulfur.

---

It is generally known that β-methylmercaptopropionaldehyde can be produced by the addition of methylmercaptan to acrolein in accordance with the reaction equation:

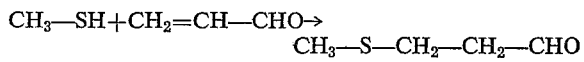

However, in the absence of any catalyst, one obtains a yield of only about 24% when the reaction is carried out at room temperature and normal pressure (see U.S. Pat. No. 2,584,496, Example 1). By raising the pressure above one atmosphere and increasing the temperature, it is possible to improve the yield of β-methylmercaptopropionaldehyde, but the formation of undesirable byproducts is also promoted.

Several processes have become known in which the reaction of methylmercaptan with acrolein is carried out in the presence of a catalyst. For example, the yield of β-methylmercaptopropionaldehyde is increased to 31% if the addition of the mercaptan to the unsaturated aldehyde is carried out in the presence of sodium methylate (see J. Am. Chem. Soc., vol. 69, pp. 2328–2335, 1947). In another known process, one can use mercury methylmercaptide or copper acetate as the catalyst in order to achieve yields of 68% or 90%, respectively (see U.S. Pat. No. 2,584,496, Examples 2 and 3). The use of such compounds as cobalt methylmercaptide or cobalt acetate is also known, and it is then possible to reach yields up to about 95%. However, these cobalt catalysts are disadvantageous in view of the fact that as metal-containing compounds they simultaneously accelerate the auto-oxidation of acrolein as well as the β-methylmercaptopropionaldehyde product. Furthermore, since traces of the catalyst always accompany the β-methylmercaptopropionaldehyde, this product must be purified or further worked up as rapidly as possible in order to avoid its undesirable auto-oxidation.

Metal-free catalysts have also been suggested for this reaction, e.g. pyridine, piperidine or triethylamine (French Pat. No. 976,673) or peroxides such as dibenzoyl peroxide (U.S. Pat. No. 2,521,677). When using these catalysts, however, the polymerization of acrolein is also strongly favored. As a result, the use of pyridine results in the formation of a viscous mass which makes the process quite difficult to carry out and leads to especially severe problems in a continuous process.

The object of the present invention is to provide a process for the production of β-methylmercaptopropionaldehyde in a catalytic reaction which permits one to achieve high yields of the desired product under advantageous conditions while avoiding previous problems of auto-oxidation, polymerization or other side reactions. Particular objects and advantages of the invention will be apparent from the following detailed description.

It has now been found, in accordance with the invention that the catalytic reaction of methylmercaptan with acrolein for the production of β-methylmercaptopropionaldehyde can be substantially improved if the reaction is carried out in the presence of a small amount of a catalyst of the formula $$R_3XY$$

wherein each R is a monovalent organic substituent or radical selected from the class consisting of aliphatic, cycloaliphatic, araliphatic and aromatic radicals in a substantially hydrocarbon structure, X is an element of Group V–A of the Periodic Chart of Elements with an atomic number of at least 15, preferably one of the elements selected from the class consisting of phosphorous, arsenic and antimony and Y is oxygen or sulfur.

The structural formula of the catalyst can be represented by

and the individual organic radicals R can be the same or different but are always linked to the element X by a carbon atom. Otherwise, it has been found that the substantially hydrocarbon structure of the radicals R is not critical in achieving high yields of the desired product and can be selected from a very wide class of substituents having anywhere from 1 up to a large whole number of carbon atoms, e.g. 36 or even more. Furthermore, the hydrocarbon structure may be a straight or branched chain in aliphatic groups or may be cyclic as in cycloaliphatic or aromatic groups. The term "substantially hydrocarbon structure" is employed herein because the organic radicals R may contain a reasonably small number of inert substituents which do not materially affect the essentially hydrocarbon nature of the entire radical, e.g. such inert substituents as alkoxy, preferably lower alkoxy of 1 to 4 carbon atoms such as methoxy or ethoxy, or halogen such as chlorine or bromine, or the like. It is especially preferred to employ as the catalyst those compounds in which each R represents a monovalent saturated hydrocarbon radical of 1 to 18 carbon atoms, the term "saturated" being understood as including aromatic radicals in which the carbon to carbon linkages are quite stable so as to be saturated in the same sense as are the single bonds between carbon atoms in an aliphatic or cycloaliphatic structure. By way of example, R can be selected from such radicals as: methyl, ethyl, propyl, isopropyl, butyl, hexyl, dodecyl, octadecyl or other alkyl groups; cyclopentyl, cyclohexyl, ethylcyclohexyl or other cycloalkyl groups of preferably 5 to 8 carbon atoms in the ring structure; and aromatic or araliphatic radicals such as phenyl, ethylphenyl, ethoxyphenyl, chlorophenyl; α-naphthyl, β-naphthyl, phenanthrenyl, benzyl and phenylethyl. Phenyl is particularly useful for each R radical, i.e. to provide compounds of the formula $(phenyl)_3XY$ wherein X is P, As or Sb and Y is oxygen or sulfur.

Especially preferred catalysts for the reaction according to the invention are triphenylphosphine oxide and triphenylphosphine sulfide. The following catalytically effective compounds may also be named by way of example:

Tri-n-butyl-phosphine oxide or sulfide;
Tri-cyclohexyl-phosphine oxide or sulfide;
Diphenyl-methyl-phosphine oxide or sulfide;
Diethyl-phenyl-phosphine oxide or sulfide; and
p-tolyl-diphenyl phosphine oxide or sulfide.

The corresponding arsenic or antimony compounds are likewise very effective catalysts and a wide variety of these catalysts are illustrated in connection with the working examples below.

The effect of the catalyst is noticeable even with very small amounts of about 0.01% by weight with reference to the acrolein reactant. It is generally sufficient to employ the catalytic compound in an additive amount of at least about 0.05% by weight with reference to the acrolein in order to achieve satisfactory yields of 90% and more. By increasing the concentration of the catalyst, the yields can be still further increased. However, it is not expedient to introduce more than 10% by weight of the catalyst, because yields tend to drop again at too high a concentration of the catalyst. The preferred amount of catalyst is about 0.1 to 5% by weight with reference to the acrolein. One can use the catalyst as an individual compound of the formula $R_3XY$ or as mixtures of such compounds.

In the catalytic process of the invention, the reaction of the methylmercaptan with acrolein can take place within a relatively large range of temperature and pressure. Temperatures of about $-10°$ C. to $+50°$ C. have proven to be especially favorable. A normal pressure of about one atmosphere is most convenient but elevated pressures are also suitable. The process can be conducted in a continuous manner as well as discontinuously, i.e. batchwise.

The acrolein reactant should be as free of water as possible. Also, the methylmercaptan used as the initial reactant should be as free as possible of hydrogen sulfide, especially satisfactory results being achieved where the hydrogen sulfide content of the methylmercaptan is less than 0.2% by weight.

By carrying out the reaction of methylmercaptan with acrolein in admixture with the catalyst of the invention, it is possible to achieve yields of 95% and more without introducing other special additives or using unusual reaction conditions. Furthermore, there is practically no auto-oxidation of the aldehyde. Since the catalytic compounds employed are well soluble in the reaction mixture, there is obviously provided an essentially homogeneous catalyst which is of great advantage in conducting the process.

After the reaction is completed, the separation of the catalyst can be accomplished without difficulties, the catalytic compounds being quite stable and having a very low vapor pressure so that the reaction product is readily drawn off by simple distillation, preferably under a vacuum. The troublesome bumping or knocking, which occurs during vacuum distillation of the aldehyde product in the presence of metal salts, does not take place when using the catalysts of the present invention. The β-methylmercaptopropionaldehyde obtained after this distillation from the reaction medium is free of traces of metal and has a good stability in storage.

The invention is illustrated by but not restricted to the following examples:

EXAMPLE 1

Into a 100 ml. glass flask, which is provided with a thermometer, a gas feed conduit containing glass frit and a gas vent closed with a small gas bubbler, there are introduced 33.15 grams of acrolein (which has a bromometric acrolein content of 93% and which has been distilled over a Linde molecular sieve of 4 A. and stabilized with 0.1% by weight of hydroquinone) and 0.7 gram of triphenylphosphine sulfide (about 2% by weight with reference to the acrolein). Next, there is introduced as rapidly as it can be absorbed a weight uptake of 29.35 grams of methylmercaptan (96% with a content of hydrogen sulfide of less than 0.2% by weight). The temperature is maintained at 20° C. by cooling with ice. After a period of 60 to 90 minutes, the introduction of the methylmercaptan is completed. The reaction mixture is then maintained for still another 30 minutes at 40° C. Finally, the reaction is subjected to a vacuum distillation for recovery of the product. At 60–61° C. and 15 mm. Hg, there is distilled over 56.8 grams of β-methylmercaptopropionaldehyde (98.7% of theory). The product has a purity of 99.7% as determined by gas chromatography.

EXAMPLE 2

The reaction is carried out using similar proportions and under conditions which are otherwise identical to those of Example 1, using in this case only 0.035 gram of triphenylphosphine sulfide as the catalyst (approximately 0.1% by weight with reference to the acrolein). The yield of β-methylmercaptopropionaldehyde amounted to 97.3%.

Further examples are collected in the following table, the reaction procedure being the same as that employed in Example 1 but using a different catalyst in each case. The percentage of the catalyst is taken with reference to the acrolein reactant.

TABLE

| Example No. | Catalyst | Amount of catalyst, percent by wt. | Percent yield |
|---|---|---|---|
| 3 | $(n-C_4H_9)_3PS$<br>$R_3$=tri-n-butyl | 2.0 | 96.4 |
| 4 | $(C_6H_{11})_3PO$<br>$R_3$=tricyclohexyl | 2.0 | 95.8 |
| 5 | $(C_6H_5)_3AsO$<br>$R_3$=triphenyl | 2.0 | 96.4 |
| 6 | $(C_6H_5)_3SbO$<br>$R_3$=triphenyl | 2.0 | 96.2 |
| 7 | $(i-C_3H_7)_3PO$<br>$R_3$=tri-isopropyl | 1.0 | 96.2 |
| 8 | $(CH_3)_2(n-C_6H_{13})PS$<br>$R_3$=dimethyl-n-hexyl | 2.0 | 96.8 |
| 9 | $(C_{18}H_{37})_3SbO$<br>$R_3$=tri-octadecyl | 2.0 | 94.9 |
| 10 | $(3-CH_3C_5H_9)_3AsO$<br>$R_3$=tri-(3-methylpentyl) | 1.8 | 95.9 |
| 11 | $(C_2H_5)_2(C_6H_{11})AsS$<br>$R_3$=diethyl-cyclohexyl | 1.5 | 95.8 |
| 12 | $(p-CH_3C_6H_4)_3PS$<br>$R_3$=tri-(p-methylphenyl) | 1.6 | 97.1 |
| 13 | $(CH_3)_2(C_6H_5)AsS$<br>$R_3$=dimethyl-phenyl | 1.0 | 96.7 |
| 14 | $(\alpha-C_{10}H_8)_3PO$<br>$R_3$=tri-α-naphthyl | 2.0 | 96.5 |
| 15 | $(m-CH_3OC_6H_4)_3PS$<br>$R_3$=tri-(m-methoxyphenyl) | 1.2 | 95.9 |
| 16 | $(C_6H_5CH_2)_3SbS$<br>$R_3$=tri-benzyl | 1.4 | 95.7 |

As will be recognized from the foregoing description and examples, all of the catalysts of the invention permit one to achieve exceptionally good yields in a process which is otherwise conducted in a conventional manner under conditions capable of being easily controlled. Ordinary variations can thus be made in the process of the invention without departing from the spirit or scope thereof as set forth in the appended claims.

The invention is hereby claimed as follows:

1. In a process for the production of β-methylmercaptopropionaldehyde by the catalytic reaction of methylmercaptan with acrolein, the improvement which comprises carrying out said reaction at a temperature of about $-10$ to $+50°$ C. in the presence of a catalyst of the formula $$R_3XY$$ 

wherein each R is a monovalent hydrocarbon substituent selected from the class consisting of aliphatic, cycloaliphatic, araliphatic and aromatic radicals, X is an element selected from the class consisting of phosphorous, arsenic and antimony and Y is an element selected from the class consisting of oxygen and sulfur.

2. A process as claimed in claim 1 wherein said catalyst is employed in an amount of about 0.1 to 5% by weight with reference to the acrolein reactant.

3. A process as claimed in claim 1 wherein each R in the catalyst of the formula $R_3XY$ is a monovalent saturated hydrocarbon radical of 1 to 18 carbon atoms.

4. A process as claimed in claim 1 wherein said catalyst is triphenylphosphine oxide.

5. A process as claimed in claim 1 wherein said catalyst is triphenylphosphine sulfide.

6. A process as claimed in claim 1 wherein said reaction is carried out at a temperature of about −10 to +50° C. with an amount of said catalyst of about 0.05 to 10% by weight with reference to the acrolein reactant.

7. A process as claimed in claim 1 wherein said catalyst is a compound selected from the class consisting of $(phenyl)_3PO$, $(phenyl)_3PS$, $(phenyl)_3AsO$, $(phenyl)_3AsS$, $(phenyl)_3SbO$ and $(phenyl)_3SbS$.

References Cited

FOREIGN PATENTS 1,150,252    4/1969    Great Britain   _____ 260—601

BERNARD HELFIN, Primary Examiner

R. H. LILES, Assistant Examiner